United States Patent
Umemura

[11] 3,731,602
[45] May 8, 1973

[54] REFLEX CAMERA AUTOMATIC SHUTTER TIMING MECHANISM

[75] Inventor: Yukio Umemura, Tokyo, Japan

[73] Assignee: Asahi Kogaku Kogya Kabushiki Kaisha, Tokyo-to, Japan

[22] Filed: Nov. 26, 1971

[21] Appl. No.: 202,360

[30] Foreign Application Priority Data

Feb. 22, 1971 Japan..........................46/10386

[52] U.S. Cl................................95/10 CT, 95/42
[51] Int. Cl............................G03b 7/08, G03b 19/12
[58] Field of Search..............................95/10 CT, 42

[56] References Cited

UNITED STATES PATENTS

| | | | |
|---|---|---|---|
| 3,623,410 | 11/1971 | Mita | 95/10 C |
| 3,437,026 | 4/1969 | Espig | 95/53 |
| 3,581,633 | 6/1971 | Uno | 95/10 CT |

Primary Examiner—Joseph F. Peters, Jr.
Assistant Examiner—Michael D. Harris
Attorney—Stanley Wolder

[57] ABSTRACT

A single lens reflex camera includes a shutter control network connected through a first normally open switch to an energizing battery and containing a light measuring circuit and an adjusting circuit connected to a computor circuit whose output is connected through a normally closed second switch to a memory circuit which controls a shutter timing circuit. The partial depression of the shutter release button closes the first switch and a mirror retraction member, before release of the shutter, actuates a member which locks the button in its depressed position and opens the second switch. The return of the mirror retraction member retracts the locking member to close the second switch and release the shutter release button which returns to its retracted position and opens the first switch.

4 Claims, 4 Drawing Figures

REFLEX CAMERA AUTOMATIC SHUTTER TIMING MECHANISM

BACKGROUND OF THE INVENTION

The present invention relates generally to improvements in camera electric shutter timing mechanisms and it relates particularly to an improved single lens reflex camera with a light responsive shutter timing mechanism of low electric power consumption.

In a single lens reflex camera it is conventional to employ a through-the-lens light measurement system (TTL system) by placing the light receiving element for light measurement in the light path of the viewfinder. With this system it is necessary to provide an arrangement for temporarily memorizing the result of the light measurement of the object to be photographed at the moment immediately before shutter release because the light measurement is interrupted by the mirror retraction or swing-up operation at immediately prior to the shutter release operation. With an electric shutter arrangement in which the exposure time is automatically electrically effected, in order to conserve the battery current source as far as possible it should be employed only when the shutter timing operation is necessary. If arrangement is so made that the connection of the current source is made by the depression of the shutter button, then a result is obtained which is effective for reducing the energy consumption of the battery. However, if the exposure time is long, this procedure is very awkward for the operator since he must keep the shutter button depressed for a correspondingly long time.

SUMMARY OF THE INVENTION

It is a principal object of the present invention to provide an improved camera automatic electric shutter timing mechanism.

Another object of the present invention is to provide an improved automatic electric shutter timing mechanism in a single lens reflex camera employing a through-the-lens light measuring system.

Still another object of the present invention is to provide in a single lens reflex camera with a through-the-lens light measuring system, an automatic light responsive shutter timing mechanism in which electric current consumption is minimized.

A further object of the present invention is to provide a shutter timing mechanism of the above nature characterized by its efficiency, reliability and versatility.

The above and other objects of the present invention will become apparent from a reading of the following description taken in conjunction with the accompanying drawings which illustrate a preferred embodiment thereof.

In a sense the present invention contemplates in a camera having an electric timing mechanism in which the timing network is connected to a battery through a normally open switch which is closed with the partial depression of the shutter release member the provision of means for releasably locking the switch in its closed position with the depression of the shutter release member. The shutter timing network includes a light measuring circuit connected through a normally closed second switch to a memory circuit, which controls a timing circuit whose output controls the closing of the shutter, the second switch being opened with the locking means being in its lock position. In a single lens reflex camera with a mirror swingable to a retracted position from an advanced light intercepting position upon full depression of the shutter release member and returnable to its advanced position, a mirror drive member actuates the locking means so as to assume its unlock and lock positions with the advance and retracted positions respectively of the mirror. Advantageously the shutter release button acts directly on the arm of the first switch to close the latter at an adjustable point in the depression of the button and is provided with a shoulder which is releasably engaged by a corresponding shoulder on a slide member defining the locking means. The slide member is transferred between shoulder engage and disengage positions by an intermediate lever chain which is spring urged to a button lock position and coupled to a mirror actuating lever so as to be retracted by the advancing mirror.

The improved mechanism is simple, rugged and reliable, minimizes the battery current consumption by effecting the connection of the battery to the timing network at only that point which is essential to the operation thereof without the necessity of the operator continuing this manual pressure on the shutter release button even during long exposure times.

DESCRIPTION OF THE PREFERRED EMBODIMENT

Figure 2:
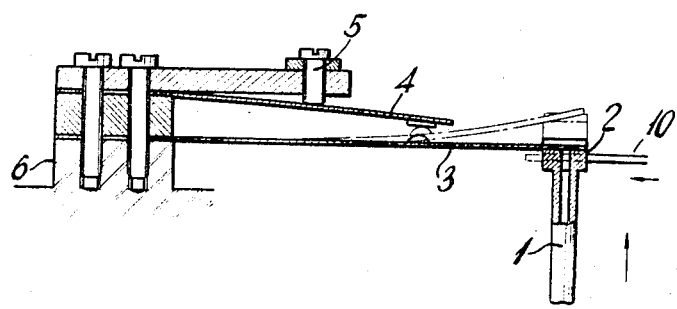
FIG. 2 is an enlarged vertical sectional view of the battery control switch thereof.

Referring now to the drawings which illustrate a preferred embodiment of the present invention, the reference numeral 1 generally designates an axially movable shutter release member button or shaft provided at an end portion thereof with a flange 2. One contact piece or resilient arm 3 of a current source switch $S_1$, which will be hereinafter described, is normally urged against the flange 2 due to its resiliency. A contact piece 4 is oppositely so arranged that it comes into contact with the contact piece 3 when the contact piece 3 is flexed due to movement of the shaft 1. The contact pieces 3 and 4 are fixed at their ends to a support 6 with an insulating member therebetween. The support 6 includes an arm which is provided with a screw 5 for adjusting the position of the contact piece 4 as will be readily understood by referring to FIG. 2.

An operating rod or lock defining side plate 7, which is movable in a direction that is perpendicular to the shaft 1, is slidably supported by means of pins 8, 8 fixed to a stationary section and slideably engaging a slot 9 in plate 7. The end portion of the operating plate 7, which end portion is at right angle to the shaft 1, is provided with a fork delineating longitudinal recess 10. Due to movement of the plate 7, the shaft 1 enters the recess 10. The movement of the plate 7 is under control of a bell crank or link lever 12 by means of a pin 11 which is fixed to one operating end portion of the lever 12 and whose end portion engages a notch 24 provided at one portion of the rod 7. A pin 13 fixed to the other operating end portion of the link lever 12 engages a notch 15 provided at one end portion of an operating lever 14. The operating lever 14 is provided with a spring 16 urging it in clockwise direction as viewed in FIG. 1. The other end portion of the operating lever 14 is bent to form an engaging portion or shoulder 17. The engaging portion 17 is normally in contact with an engaging pin 19 provided at one end portion of a mirror swing-up driving lever 18 of a single lens reflex camera. A pin 20 is fixed to one portion of the slide plate 7, and a movable resilient contact piece 21 of a memory switch $S_2$, which will be described hereinafter, is positioned within the moving path of the pin 20.

Figure 1:
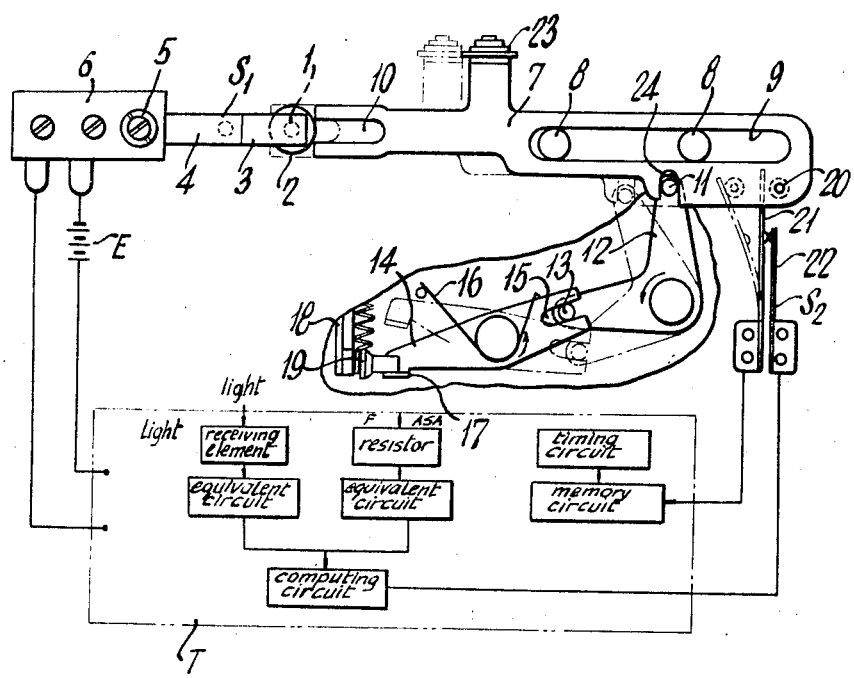
FIG. 1 is a plan view partially broken away and a block diagram of a mechanism embodying the present invention.

When the shutter shaft is depressed, the shaft 1 moves toward the reader in FIG. 1 (upwards in FIG. 2) and the contact piece 3 comes into contact with the contact piece 4. At the same time, due to action of well-known ordinary camera release initiating mechanism, the mirror swing-up driving lever 18 moves upwards as viewed in FIG. 1, performing the first stage of the shutter opening operation. This action causes the engaging pin 19 to disengage shoulder 17 of the operating lever 14 so that, under the influence of the spring 16, the operating lever 14 swings in clockwise direction as viewed in FIG. 1. Due to this action, the link lever 12 swings counterclockwise so that the pin 11 fixed to the link lever 12 slides in the notch 24 and causes the operating rod 7 to be moved to the left as viewed in FIG. 1. Since this movement is carried out within a very short time after depression of the shaft 1, the shaft 1 and the slide plate 7 come into a relative position of crossing each other at right angle with the shaft 1 at the depressed position and in the recess 10. In this crossed state, the underface of the flange 2 is engaged by the portion of the operating plate 7 which borders the recess 10 so that the shaft 1 is releasably locked and cannot return to the original position and remains in the depressed position. Due to the resulting pressure of the flange 2 the contact pieces 3 and 4 contact each other so that the current source switch $S_1$ is closed. The movement of the operating plate 7 causes the pin 20 to bring the movable contact 21 out of contact with a contact 22 so that the memory switch $S_2$ is opened. In the final stage of shutter release action the mirror swing-up driving lever 18 returns to the original position so that the engaging pin 19 pushes the shoulder 17 of the operating lever 14 against the action of the spring 16 so that there is caused an action which is reverse to the aforementioned one of the operating lever 14, the link lever 12 and the operating plate 7, all of these members returning to the respective original positions.

The action of the operating plate 7 due to shutter button action can also be carried out by means of a manually operated member 23 formed on the operating plate 7 and projecting out of the camera casing.

The retention of displaced position of the operating rod 7 causes retention in the operational state of the current source switch $S_1$ consisting of the contact pieces 3 and 4 and the memory switch $S_2$ consisting of contact pieces 21 and 22.

The current source switch $S_1$ is serially connected in the current source circuit of the battery E. Closure of the switch $S_1$ connects the current supply to the electrically operating section T of the electric shutter arrangement. Thus, the switch $S_1$ acts as the operation starting switch of the electrically operating section T. The closure of the memory switch $S_2$ causes a memorizing operation of the electrically operating section T during a lapse of a short time from the start of operation of the electrically operating section T due to the closure of the current source switch $S_1$ effected by the movement of the operating rod 7 with the operation of the mechanical section therebetween. Then, the memory switch $S_2$ opens in the early stage of the movement of operating rod 7 to discontinue influence on the memory section of the computer circuit which responds to signals from a light controlled circuit and a circuit which is adjusted to other photographic parameters.

The operation of the electrically operating section is as follows: The light rays from the object to be photographed pass through the camera objective and are received by a light receiving element placed within the viewfinder light path of a single lens reflex camera. The object brightness information sensed by the light receiving element is transformed into an electric signal by means of an equivalent circuit in a known predetermined manner. The condition for determination of exposure time such as the sensitivity value of the used film or the set diaphragm value is transformed into a resistance value of a resistor. And this is then further transformed into an electric signal by means of an equivalent circuit in a known and predetermined manner. The outputs of these two equivalent circuits are related or computed by a computing circuit. The resulting value is applied through the memory switch $S_2$ to the memory circuit of known construction. The memory circuit applies the information, which it memorized before the opening of the memory switch $S_2$, to the timing circuit in synchronism with opening of shutter. The timing circuit determines the timing value on the basis of the memorized information in a known manner.

Figure 3:
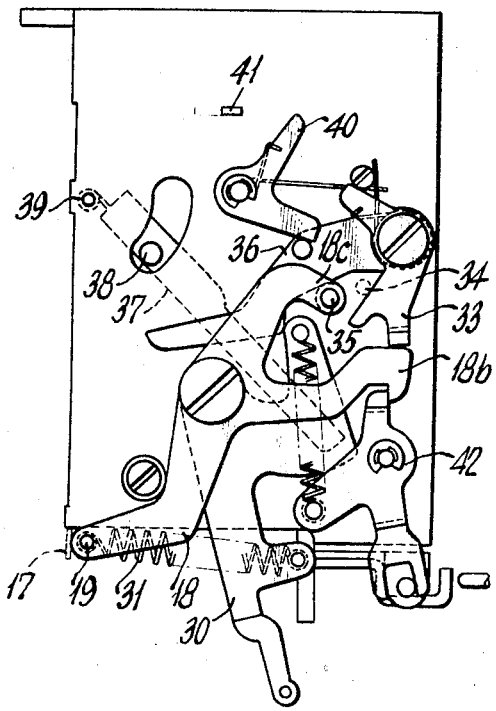
FIG. 3 is an elevational view of the shutter release and mirror mechanism associated with the improved mechanism.

As shown in FIG. 3, a spring 31 is arranged between the mirror driving lever 18 and a shutter charge or cocking lever 30. The pin 19 is fixed to the first one of the three operating end portions of the lever 18. The second operating end portion 18b is positioned to abut an engaging lever 33. A pin 34 is arranged to so act upon the engaging lever 33 consequent to depression of the shaft 1 that the engaging lever 33 is caused to withdraw from the abutting position. A pin 35 is fixed to the third operating end portion of lever 18. As the pin 35 moves with the swinging of lever 18, it pushes an intermediate lever 36 and causes it to swing so that the end portion of the intermediate lever 36 bears on a pin 38 fixed to the side portion of a mirror supporting frame 37 and swings the latter. As a result, the frame 37 is swung upwardly about a fulcrum 39. Simultaneously with this mirror frame swing-up movement, the intermediate lever 36 so acts on a shutter actuating lever 40 that the lever 40 is, caused to swing and when the swinging mirror frame reaches the last stage of its upward movement the actuating lever 40 causes the shutter opening lever 41 to be actuated.

The second operating end portion 18b also functions as a releaseable restraining element acting to lock a stop-down driving lever 42. The swing movement of the operating end portion 18b disengages the lever 42 so that the lever 42 swings due to the action of a cooperating spring.

Figure 4:
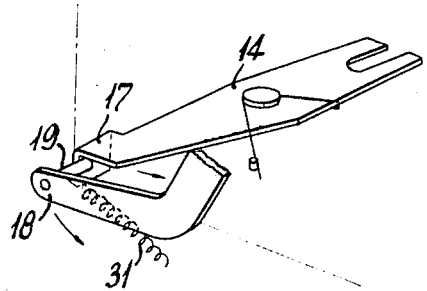
FIG. 4 is an enlarged perspective view of the switch control and shutter release coupling mechanism.

When, due to depression of the shutter button, the pin 34 moves downwardly, as viewed in FIG. 3, the lever 33 swings counter-clockwise so that the mirror driving lever 18 swings counterclockwise to perform a diaphragm stop-down action and mirror swing-up action. At the same time, the first operating end portion makes a movement as shown by the arrow in FIG. 4 so that the operating lever 14 swings in the direction shown by the arrow (clockwise in FIG. 1).

The mechanism of the present invention as described above operates so that the current source switch for actuating the exposure time determining circuit is closed in the first stage of shutter button depression movement so that the electric circuit is caused to operate only when necessary to save the energy of the battery as far as possible. A member is provided which retains the shutter button shaft in its depressed position, this retaining member is driven by an intermediate member operating in response to the action of the mirror driving lever, and the retaining member operates the memory switch. Accordingly the shutter button depression first causes the current source switch to be closed so as to start the operation of the electric circuit, and, after a lapse of time necessary for object light measurement and information memorization operations of the electric circuit and immediately before the mirror swing-up operation, in the first stage of said shutter button depressed position retention, the memory switch is operated to perform proper exposure time control. The shutter button can be automatically retained in depressed position during the exposure interval.

While there has been described and illustrated a preferred embodiment of the present invention it is apparent that numerous alternations, omissions and additions may be made without departing from the spirit thereof.

What is claimed is:

1. In a single lens reflex camera including an electrically timed automatic shutter, an electrical network for timing said shutter in response to the camera incident light including a voltage source, a first normally open switch connecting said voltage source to said network, a memory circuit and a normally closed memory circuit actuating switch connected to said memory circuit, a mirror swingable between an advanced position and a photographing retracted position, a mirror drive member for retracting and advancing said mirror, a shutter release member advancable to sequentially close said first switch and release said drive member to retract said mirror, a longitudinally movable slide member spring biased to follow said drive member to move to an advanced position with the mirror retraction movement of said drive member, said slide member having a first end movable with the advance of said slide member into locking engagement with said shutter release member in its advanced switch closing position and movable with the retraction of said slide member to release said shutter release member and an opposite second end movable with the retraction of said slide member to close said second switch and with the advance of said slide member to release said second switch to its open position.

2. The single lens reflex camera of claim 1 comprising motion transmission means including a swingable lever intercoupling said mirror drive member and said slide member.

3. The single lens reflex camera of claim 1 including means for manually retracting said slide member.

4. The single lens reflex camera of claim 1 wherein said shutter release member comprises a rod having an enlarged portion and said slide member first end is provided with a longitudinal slot open at the free end of said slide member and adapted to slideably engage said rod and having a width less than that of said enlarged portion.

* * * * *